United States Patent Office 3,389,192
Patented June 18, 1968

3,389,192
BLENDS OF FLAME RETARDANT UNSATURATED
POLYESTER RESINS AND ACRYLIC SYRUP
Mandell S. Ziegler, Massapequa, N.Y., assignor, by mesne assignments, to Talley Industries, Inc., Lindenhurst, N.Y., a corporation of Delaware
No Drawing. Filed May 24, 1963, Ser. No. 282,872
16 Claims. (Cl. 260—862)

ABSTRACT OF THE DISCLOSURE

This invention relates to heat hardenable resinous mixtures of improved light stability for laminating and molding comprising a mixture of a halogenated polyester and an acrylic syrup. The halogenated polyester comprises condensed hexachloroendomethylene tetrahydrophthalic compound and is dissolved in a vinyl monomer such as styrene. The acrylic syrup comprises a polymer of at least 50% by weight methyl methacrylate dispersed in liquid unsaturated material containing at least 75% by weight monomeric methyl methacrylate.

---

The present invention relates to polyester resins based on hexachloroendomethylene tetrahydrophthalic anhydride and fiberglass-reinforced products incorporating the same characterized by improved weather resistance and, preferably also, by improved fire retardance.

Polyesters based on hexachloroendomethylene tetrahydrophthalic anhydride are known and perform well when used in fiberglass panels, but these panels, when exposed in roofs or exterior wall sections to direct sunlight, deteriorate badly. Thus, unpigmented panels turn yellow, and then dark brown, the initial gloss is completely lost, the panel loses its capacity to transmit light and, after several years, the panel suffers a serious loss in strength and its capacity to carry out its function.

Numerous efforts have been made to correct the above disadvantage, but without success. In this connection, the addition of ultraviolet absorbers is not effective, and efforts to incorporate methyl methacrylate monomer in amounts up to 25% of total resin provides a barely perceptible improvement. Above 25%, the mixture of the polyester system with methyl methacrylate monomer becomes excessively fluid for ordinary handling and, besides, it is taught by the art that high concentrations of methyl methacrylate monomer would lead to the formation of methyl methacrylate homopolymer causing fiber prominence, loss of gloss through incompatibility and increased susceptibility to moisture attack.

Accordingly, the present invention is directed to new and improved polyester resin systems based on hexachloroendomethylene tetrahydrophthalic anhydride (or acid) which possess improved resistance to sunlight deterioration as exhibited by resistance to yellowing. Further, these systems may be modified by the addition of fire retardant agents to improve the fire retardance of the system. Moreover, and whereas ultraviolet light absorbents were ineffective in polyesters based on hexachloroendomethylene tetrahydrophthalic anhydride, these absorbents may be added with effectiveness to the polyester systems of the present invention.

In accordance with the present invention, a polyester resin based on hexachloroendomethylene tetrahydrophthalic anhydride is blended with an acrylic syrup comprising a methyl methacrylate polymer dispersed and preferably dissolved in liquid monomer consisting essentially of methyl methacrylate to provide a polyester resin system which, upon curing, exhibits improved resistance to weathering. These improved polyester resin systems are desirably modified by the incorporation therein of a small proportion of fire retardant agent to improve the fire retardant properties of the cured system. Further, ultraviolet light absorbents which are ineffective in the pure polyester resin are desirably incorporated in the system to further reduce the tendency of the cured system to yellow upon exterior exposure.

The polyester resin systems of the invention may be utilized in conventional molding and laminating procedures either with or without the addition of conventional fillers, and reinforcing material such as glass fibers. Of greatest importance, however, is the use of the systems of the invention in the production of fiberglass panels useful as structural sheets.

In accordance with the invention, one of the essential components of the new resin system is an ethylenically unsaturated polyester resin comprising condensed hexachloroendomethylene tetrahydrophthalic anhydride or its corresponding acid or acyl halide. These polyester resins are known per se and commonly comprise the polyesterification product of said anhydride, an unsaturated acid such as maleic acid or anhydride, or fumaric acid and polyhydric components such as ethylene glycol, propylene glycol, butylene glycol, diethylene glycol, dipropylene glycol, glycerine, or pentaerythritol, either alone or in appropriate admixture. Normally, the mol ratio of said anhydride to the unsaturated acid is in the range of from 1:2 to 1:6. The polyester may be hydroxyl-functional or carboxyl-functional, hydroxyl numbers up to about 400 and carboxyl numbers up to about 400 being permissible. The preferred polyesters are produced from systems in which the hydroxy and carboxyl functionality are within 10% of equality. A particularly suitable polyester resin used to illustrate the present invention is a polyester of 1 mol of said anhydride, 2 mols maleic anhydride and 3 mols of an equimolecular mixture of ethylene glycol and propylene glycol.

As is also known, polyesters as indicated above are normally cured with a monovinyl unsaturated monomer consisting essentially of monovinyl aromatic compound such as styrene, vinyl toluene and halo-substituted styrene and vinyl toluene further illustrating appropriate monovinyl aromatic compounds. These function to dissolve the polyester and to cure it and are used in an amount of 15–60%, preferably from 25–35%, based on the total weight of the polyester and monovinyl aromatic compound. The invention will be illustrated using styrene in an amount of 30% on said weight basis. Accordingly, the designation "polyester resin mixture A" denotes the specific polyester referred to in the preceding paragraph dissolved in styrene in amounts providing 30 parts of styrene to 70 parts of polyester.

The acrylic syrups used in accordance with the invention are dispersions of methyl methacrylate polymer in methyl methacrylate monomer. Preferably, the polymer is substantially fully dissolved in the monomer. Thus, the syrup comprises a polymer of at least 50% and more preferably at least 80% by weight of methyl methacrylate, preferably a solution polymer of at least 90% by weight of methyl methacrylate, including methyl methacrylate homopolymer. Less desirably, the polymer may include up to 50% by weight, but preferably less, of other ethylenically unsaturated monomer copolymerizable with methyl methacrylate. Suitable unsaturated materials are illustrated by acrylonitrile, styrene, alkyl acrylates such as methyl acrylate, ethyl acrylate and 2-ethylhexyl acrylate, and other alkyl methacrylates such as ethyl methacrylate and butyl methacrylate. Monomers which contain a single ethylenic unsaturation as the sole functional group thereof are prefererred, but small amounts of other vinyl monomers such as acrylic acid may be present.

The liquid methyl methacrylate monomer which is used to disperse the polymer preferably is the sole liquid constituent of the syrup. However, limited amounts up to 25% by weight, based on the total weight of the liquid constituent, of other liquid ethylenically unsaturated materials may be tolerated. Suitable materials for this purpose are illustrated by vinyl acetate, alkyl acrylates and methacrylates as ethyl acrylate and butyl methacrylate, styrene and other liquid vinyl monomer preferably devoid of reactive functional groups.

The methyl methacrylate syrups are preferably produced by solution copolymerization at elevated temperature in the presence of a free-radical polymerization catalyst, such as a peroxide or azo type catalyst which are well known for this purpose. The reaction is allowed to proceed until the polymer possesses an inherent viscosity within the range of 0.25 to 1 and preferably within the range of 0.3 to 0.55 determined at 20° C. in chloroform solution at a concentration of 0.50 grams/100 ml. of solution according to the method described in F. W. Billmeyer, Textbook of Polymer Chemistry, Interscience Publishing, Inc. (1957) p. 128. When the desired viscosity is obtained, the reaction is quench by adding a small amount of a polymerization inhibitor, such as a catechol, in admixture with cold methyl methacrylate as a quenching solution, thus providing a methyl methacrylate polymer in methyl methacrylate monomer syrup having a bulk viscosity of 0.5 to 50 poises (Gardner).

The quenching solution will desirably contain from 0.001 to 1% by weight of polymerization inhibitor.

It is also preferred to employ a specific proportion of free-radical polymerization catalyst so that the final syrup contains less than 20 p.p.m. of the catalyst. The approximate amount of catalyst which can be added to the polymerization system so that less than 20 p.p.m. will remain in the final syrup can be calculated in accordance with the formula: $X = 10^{-3} \cdot 2^{Pt/H}$, where X is the weight precent, based on monomers, of initiator added prior to polymerization, H is the half-life of the initiator at the reaction temperature and $Pt$ is the polymerization time.

The concentration of polymer in the syrup should be at least about 15% by weight, preferably at least 20% and is desirably higher, e.g., 30% or more, the maximum concentration being limited by the fluidity desired. The specific syrup shown in Example I of British Patent 870,191 and which contains 35% of methyl methacrylate homopolymer in methyl methacrylate monomer forming a syrup having a viscosity of 20 poises at 25° C. is used herein to illustrate the invention and is identified as "methyl methacrylate polymer/monomer syrup A."

Appropriate methyl methacrylate syrups are more fully described in British Patent 870,191 issued June 14, 1961, of which I am co-inventer.

It is preferred to employ the polyester resin in the blends in a weight ratio of polyester solution to acrylic syrup from 25:75 to 75:25, more preferably from 30:60 to 60:30 and most preferably in a ratio of substantially 50:50.

When the essentially liquid system of the invention is used in molding compositions, it is preferred to select proportions of components within the ranges disclosed hereinbefore to provide a final viscosity which conforms with conventional practice for such utility.

The polyester resin blends when cured by exposure to elevated temperature curing conditions provide cured products which unexpectedly possess weathering resistance significantly superior to the polyester resin used alone. However, the fire retardant properties of the blends are not as good as those of the polyester resin alone. In preferred practice, it is desired to have fire resistance accompany weather resistance and, for this purpose, the blends of the present invention further include up to 20% by weight, based on the total weight of the system, of a fire retardant agent to preferably provide a final cured product having fire retardant properties equal to that of the polyester resin when used alone. The blends of the invention including a fire retardant agent permit the achievement of satisfactory fire retardant products which have improved weathering resistance.

The fire retardant agents are generally effective to some significant degree in an amount of at least 0.5% but it is preferred to employ amounts in excess of 2%, more preferably 5% or more. Of course, the most economic and effective proportion will vary somewhat depending upon the specific agent selected.

Any fire retardant agent or mixture thereof having the capacity to reduce the flammability of polymeric materials may be used in accordance with the invention and numerous of these are well known to those skilled in the art. Accordingly, the specific nature of the fire retarding agent is of secondary significance to the invention.

Nonetheless, certain types of fire retarding agents have been found to be particularly effective and the selection of these is a feature of the invention. These preferred agents broadly fall within the following classes: (1) salts of antimony, especially antimony trioxide; and (2) halogen-containing phosphorus compounds including polymeric compounds such as polyphosphonates.

Antimony salts are particularly effective fire retardant agents useful in the invention and these are illustrated by antimony trioxide, antimony trichloride, sodium metaantimoniate, etc. Antimony trioxide is preferred.

Various halogen-containing compounds containing at least 20% halogen, by weight, are also highly effective in the invention to reduce the flammability of the system. These materials are illustrated by phosphate and phosphonate ethers containing at least 20% halogen by weight such as tris(β-chloroethyl) phosphate. These may be prepared by the reaction of halogen-substituted monohydric alcohols with the selected phosphorus acid and in many other ways. The preferred phosphorus compounds are ethers and polyethers of halogen-substituted monohydric alcohols with acids of phosphorus, especially those containing 1 to 3 hydroxy groups per phosphorus atom, and more preferably those containing from 1 to 2 hydroxy groups per phosphorus atom. The term "ether" as used herein is intended to include the direct linkage of carbon to phosphorus through oxygen as well as the more conventional carbon to carbon linkage through oxygen.

The foregoing embraces several different classes of compounds and these are illustrated as follows:

(A) ethers and polyethers of halogen-substituted alcohol with polyfunctional acids of phosphorus, especially phosphoric acid and phosphonic acids containing at least 20% halogen by weight.

(1) tris (β-chloroethyl) phosphate
(2) tris (dichloropropyl) phosphate
(3) bis (β-chloroethyl) vinyl phosphonate
(4) tris (chlorobromo propyl) phosphate; and
(B) polyphosphates of the type:

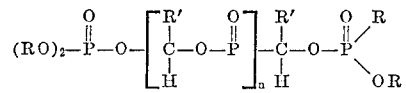

where

R = β-chloro or β-bromo alkyl radical,
R' = alkyl radical, preferably methyl, and
n = 1 to 100, preferably 1 to 6.

(The polyphosphates of this type are the reaction product of a phosphorus trihalide, an alkylene oxide, and a trialkyl phosphite.)

While ultraviolet light absorbents are ineffective when used in admixture with the polyester resin alone, surprisingly, it has been found that these absorbent materials are effective to further reduce weathering of the blends of the invention when used in laminated panels. Materials which can be utilized are well known to the art and may be illustrated by chelated hydroxy-containing aromatic compounds such as ortho-hydroxy benzophenone, and phenyl salicylate. Orthohydroxy benzophenone is preferred and is used as illustrative in the examples as the ultraviolet light absorber.

It will be understood that the invention is illustrated, but not limited by the specific examples presented hereinafter. It will also be evident that the products of the invention, while useful in diverse types of heat-hardening resinous compositions, are primarily useful in laminated building panels. These blends may be pigmented or contain dyes, flow control agents, waxes and various other components such as glass fiber reinforcement as will be evident to those skilled in the art.

In the examples which follow, all parts are by weight, unless otherwise indicated.

Examples 1-5

Weather-resistant and fire-resistant laminates using the resin systems of the present invention reinforced with 25% by weight glass fibers are prepared using conventional casting methods, e.g., casting by heating under pressure for 20 minutes at 200° F. The results reported in Table I hereinafter compare the weather resistant and fire retardant properties of the polyester resin A alone, and in admixture with an ultraviolet light absorbent; the acrylic syrup A alone and in admixture with polyester resin A and also the ultraviolet light absorbent. Significant improvement in weather resistance in the polyester-syrup blend over the polyester alone is clearly evident from the results reported in Table I.

The results of Table I indicate the extent of burning of 10 specimens of each listed composition under the conditions of ASTM D-635-56T. Non-burning indicates that the flame is extinguished before traveling one inch down the length of the specimen. Self-extinguishing indicates a material which burned beyond the one inch mark, but is self-extinguished before reaching the four inch mark. Specimens which burned beyond the four inch mark are considered flammable and a burning rate is reported for those specimens of this group.

ties is achieved by the invention, the improvement is achieved to the detriment of the fire retardant characteristics normally associated with the polyester resin used herein when these are used alone. This property of fire resistance is highly desirable and it is preferred to obtain it when using the weather-resistant blends of the present invention. To improve fire retardant characteristics, fire retardant agents are added to the blends. Table II using antimony trioxide as a typical fire retardant agent, illustrates and compares the polyester resin A alone in admixture with antimony trioxide, acrylic syrup A alone in admixture with antimony trioxide and blends of the former and the latter in admixture with antimony trioxide. The data reported in Table II evidences the fact that both improved weather-resistance and fire retardance can be obtained using the blends of the invention in the presence of a fire retardant agent and despite the fact that a comparable improvement in fire resistance is not obtained when the acrylic syrup is the sole resin component.

TABLE II

| Ex. | Parts Polyester Resin A | Parts Methyl Methacrylate Polymer/Monomer Syrup A | Parts o-hydroxy benzophenone (ultraviolet light absorber) | Parts Sb$_2$O$_3$ | Flammability Rating ASTM D-635-56T | | | | Appearance— Twelve Months Florida Exposure |
|---|---|---|---|---|---|---|---|---|---|
| | | | | | Non-burning | Self-extinguish | Flammability | Burning Rate (in./min.) | |
| 6 | 100 | 0 | 0 | 5 | 10 | | 0 | | A |
| 7 | 100 | 0 | 1 | 5 | 10 | | 0 | | A |
| 8 | 0 | 100 | 0 | 5 | 0 | 0 | 10 | 1.5 | B |
| 9 | 50 | 50 | 0 | 5 | 10 | | 0 | | C |
| 10 | 50 | 50 | 0.2 | 5 | 10 | | 0 | | D |
| 11 | 50 | 50 | 0.2 | 3 | 0 | 10 | 0 | | D |
| 12 | 50 | 50 | 0.2 | 8 | 10 | | 0 | | D |
| 13 | 70 | 30 | 0.2 | 1 | 0 | 8 | 2 | 0.3 | C |
| 14 | 70 | 30 | 0.2 | 10 | 10 | | 0 | | C |
| 15 | 30 | 70 | 0.2 | 1 | 0 | 0 | 10 | 1.4 | B |
| 16 | 30 | 70 | 0.2 | 10 | 0 | 8 | 2 | | B |

In the foregoing Table II, the designations A–D in the column identifying the appearance of the product, have the following significance:

A—Turned dark amber—complete loss of gloss
B—No significant change
C—Faint yellowing—slight loss of gloss
D—Faint yellowing—loss of gloss barely perceptible The flammability ratings are measured in the same way as is indicated in Table I.

Examples 17-20

The results reported in Table III hereinafter evidence the fact that various halogen-containing phosphorus compounds are effective to improve the fire retardance of the systems of the invention. Two compounds are given in the present examples as illustrative of the numerous compounds listed hereinbefore as being operative in the in-

TABLE I

| Example | Parts Polyester Resin A | Parts Methyl Methacrylate Polymer/Monomer Syrup A | Parts o-hydroxy benzophenone (ultraviolet light absorber) | Flammability Rating ASTM D-635-56T | | | | Appearance (Twelve Months Florida Exposure) |
|---|---|---|---|---|---|---|---|---|
| | | | | Non-burning [1] | Self-extinguish [1] | Flammability [1] | Burning Rate [2] (in./min.) | |
| 1 | 100 | 0 | 0 | 10 | | 0 | | Turned dark amber, complete loss of gloss. |
| 2 | 100 | 0 | 1 | 10 | | 0 | | Do. |
| 3 | 0 | 100 | 0 | 0 | 0 | 10 | 1.5 | No significant change. |
| 4 | 50 | 50 | 0 | 0 | 0 | 10 | 1.0 | Faint yellowing, slight loss of gloss. |
| 5 | 50 | 50 | 0.2 | 0 | 0 | 10 | 1.1 | Faint yellowing, loss of gloss barely perceptible. |

[1] Number of specimens in each classification out of a total of 10 specimens tested per composition. [2] Calculated for flammable specimens only.

Examples 6-16

While a significant improvement in weathering propervention and which can be used with equal facility in the examples.

TABLE III

| Ex. | Parts Polyester Resin A | Parts Methyl Methacrylate Polymer/Monomer Syrup A | Parts o-hydroxy benzophenone (ultraviolet light absorber) | Parts Fire Retardant Compound | Flammability Rating ASTM D-635-56T | | | | Appearance—Twelve Mont's Florida Exposure |
|---|---|---|---|---|---|---|---|---|---|
| | | | | | Non-burning | Self-extinguish | Flamma-bility | Burning Rate (in./min.) | |
| 7 | 50 | 40 | 0.2 | ¹10 | 1 | 9 | 0 | | C |
| 18 | 50 | 40 | 0 | ²10 | 0 | 7 | 3 | 0.5 | C |
| 19 | 50 | 40 | 0.2 | ²10 | 0 | 8 | 2 | 0.5 | D |
| 10 | 35 | 50 | 0.2 | ²15 | 5 | 5 | 0 | | D |
| 2 | | | | | | | | | |

¹ Tris (β-chloroethyl) phosphate. ² A commercial fire retardant agent believed to be a reaction product of phosphorus trichloride, ethylene oxide and a mixture of trialkyl phosphites, but of unknown specific composition.

The flammability ratings and product appearance reported in Table III having the same significance as indicated in Tables I and II.

In all of the foregoing tables, that products tested are panels containing 75% by weight of the resin identified and 25% by weight of glass fibers, the panels being prepared by conventional casting under pressure sufficient to consolidate the material into a unitary mass, and a temperature of 200° F. being applied for twenty minutes which is sufficient to cure all of the resin systems tested.

It should be noted that all of the examples which relate to the blends of the invention and which further contain in admixture therewith a small amount of an ultraviolet light absorbent exhibit significantly less yellowing and less loss in gloss when exposed to the elements for a period of twelve months. This result is unexpected since the same absorbent has no effect on the weathering characteristics of polyester resin A when used alone.

The invention is defined in the claims which follow.

I claim:
1. A heat-hardenable resinous mixture comprising:
   (A) a polyester resin comprising condensed hexachloroendomethylene tetrahydrophthalic compound to enhance the fire resistant properties thereof; said polyester resin being in solution in monovinyl unsaturated monomer consisting essentially of monovinyl aromatic compound, said monomer being present in an amount of 15–60% by weight, based on the total weight of said polyester and said monomer; and
   (B) a syrup of polymer comprising at least 50% by weight of methyl methacrylate dispersed in liquid unsaturated material containing at least about 75% by weight, based on total liquid material, of methyl methacrylate, the concentration of said polymer in said syrup being at least about 15% by weight and the weight ratio of said polyester solution to said syrup being in the range of from 25:75 to 75:25.

2. The resinous mixture of claim 1 in which said polymer comprises at least 80% methyl methacrylate.

3. The resinous mixture of claim 1 in which said monovinyl monomer is present in an amount of from 25–35% by weight, based on the total weight of said polyester and said monomer.

4. The resinous mixture of claim 1 which further includes an ultraviolet light absorbent.

5. The resinous mixture of claim 1 which further includes up to 20% by weight, based on total weight, of a fire-retardant agent.

6. The resinous mixture of claim 1 in which said polymer possesses an inherent viscosity within the range of 0.25 to 1 determined at 20° C. in chloroform solution at concentration of 0.50 gram per 100 ml. of solution.

7. A laminating and molding composition curable to form a weather resistant and fire retardant product comprising:
   (A) a polyester resin which is the polyesterification product of:
      (1) hexachloroendomethylene tetrahydrophthalic anhydride;
      (2) monoethylenically unsaturated organic dicarboxylic compound; and
      (3) polyhydric organic compound; said polyester resin being in solution in monovinyl unsaturated monomer consisting essentially of monovinyl aromatic compound, said monomer being present in an amount of 15–60% by weight, based on the total weight of said polyester and said monomer;
   (B) a syrup of polymer comprising at least 80% by weight of methyl methacrylate dispersed in liquid unsaturated material containing at least about 75% by weight, based on total liquid material, of methyl methacrylate, the concentration of said polymer in said syrup being at least about 30% by weight, and the weight ratio of said polyester solution to said syrup being in the range of from 25:75 to 75:25; and
   (C) from 0.5 to 20% by weight, based on the total weight of the system, of a fire retardant agent.

8. The composition of claim 7 in which the weight ratio of said polyester solution to said syrup is in the range of 30:60 to 60:30.

9. The composition of claim 7 in which said fire retardant agent is an antimony salt.

10. The composition of claim 9 in which said salt is antimony trioxide and is used in an amount of at least 2% by weight.

11. The composition of claim 7 in which said fire retardant agent is a halogen-containing organic compound containing at least 20% by weight of halogen and is selected from the group consisting of:
   (A) ethers and polyethers of halogen-substituted alcohol with polyfunctional acids of phosphorus; and
   (B) polyphosphates of the type

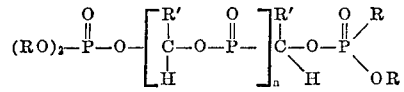

where R is β-chloro or β-bromo alkyl radical, R' is alkyl radical, and $n$ is 1 to 100.

12. The composition of claim 11 in which said polyfunctional acid of phosphorus comprises phosphoric acid.

13. The composition of claim 7 which further includes o-hydroxy benzophenone as ultraviolet light absorbent.

14. The composition of claim 7 in which said monovinyl aromatic compound is styrene.

15. The product produced by heat-curing the composition of claim 7.

16. The product of claim 15 which further includes fibrous reinforcing elements in the form of glass fibers.

(References on following page)

References Cited

UNITED STATES PATENTS

| | | | |
|---|---|---|---|
| 2,822,340 | 2/1958 | McGovern et al. | 260—869 |
| 2,880,193 | 3/1959 | Marshall et al. | 260—872 |
| 2,898,256 | 8/1959 | Robitschek et al. | 260—872 |
| 3,051,679 | 8/1962 | Forsyth | 260—862 |
| 3,092,606 | 6/1963 | Ruppert et al. | 260—865 |
| 3,261,886 | 7/1966 | Loury | 260—862 |
| 3,277,665 | 1/1966 | Fourcade | 260—862 |

FOREIGN PATENTS 913,861  12/1962  Great Britain.

MURRAY TILLMAN, *Primary Examiner.*

GEORGE F. LESMES, *Examiner.*

J. T. GOOLKASIAN, *Assistant Examiner.*